(12) United States Patent
Kim et al.

(10) Patent No.: US 7,562,829 B2
(45) Date of Patent: Jul. 21, 2009

(54) MULTI-MODE INTEGRATED CIRCUIT DEVICES INCLUDING MODE DETECTION AND METHODS OF OPERATING THE SAME

(75) Inventors: Chang-Yong Kim, Kyunggi-Do (KR); Jong-Cheol Kim, Kyunggi-Do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/062,122

(22) Filed: Apr. 3, 2008

(65) Prior Publication Data

US 2008/0185444 A1 Aug. 7, 2008

Related U.S. Application Data

(63) Continuation of application No. 11/036,735, filed on Jan. 14, 2005, now Pat. No. 7,377,442.

(30) Foreign Application Priority Data

Jul. 5, 2004 (KR) .................... 10-2004-0052078

(51) Int. Cl.
*G06K 19/06* (2006.01)
(52) U.S. Cl. .................. 235/492; 235/382; 235/486; 235/441; 235/451; 235/390
(58) Field of Classification Search ............... 235/486, 235/382, 492, 380, 441, 451
See application file for complete search history.

(56) References Cited

U.S. PATENT DOCUMENTS 5,828,892 A  10/1998  Mizuta
5,847,372 A  12/1998  Kreft .................. 235/492
6,168,077 B1  1/2001  Gray et al. .................. 235/375
6,439,464 B1  8/2002  Fruhauf et al. .................. 235/492
2002/0158126 A1*  10/2002  Omet .................. 235/451

(Continued)

FOREIGN PATENT DOCUMENTS

EP  0 748 485 B1  12/1996

(Continued)

OTHER PUBLICATIONS

Office Action for German Patent Application 10 2005 032 483.5-53; date of mailing Jul, 7, 2006.

*Primary Examiner*—Allyson N Trail
(74) *Attorney, Agent, or Firm*—Myers Bigel Sibley & Sajovec

(57) ABSTRACT

Multi-mode integrated circuit devices on an integrated circuit substrate include a controller configured to operate in a first mode compliant with the International Standard Organization (ISO) specification ISO 7816 and a second mode different from ISO 7816 responsive to a mode selection signal. A first plurality of input/output pads are associated with operations in the first mode and a second plurality of input/output pads are associated with operations in the second mode. A mode detector circuit is coupled to at least one of the second plurality of input/output pads and configured to detect connection of the at least one of the second plurality of input/output pads to an external device and to activate the mode selection signal to select the second mode responsive to detection of connection of the at least one of the second plurality of input/output pads to the external device.

29 Claims, 7 Drawing Sheets

U.S. PATENT DOCUMENTS

| | | | |
|---|---|---|---|
| 2003/0075601 A1* | 4/2003 | Yagi et al. | 235/382 |
| 2003/0135655 A1 | 7/2003 | Chiu et al. | 709/250 |
| 2003/0155420 A1 | 8/2003 | Morrow et al. | 235/449 |
| 2006/0049258 A1* | 3/2006 | Piikivi | 235/451 |
| 2006/0163364 A1* | 7/2006 | Sakamura et al. | 235/492 |
| 2006/0208066 A1* | 9/2006 | Finn et al. | 235/380 |
| 2007/0012785 A1* | 1/2007 | Ohyama | 235/492 |

FOREIGN PATENT DOCUMENTS

| | | |
|---|---|---|
| WO | 02/31762 | 4/2002 |

* cited by examiner

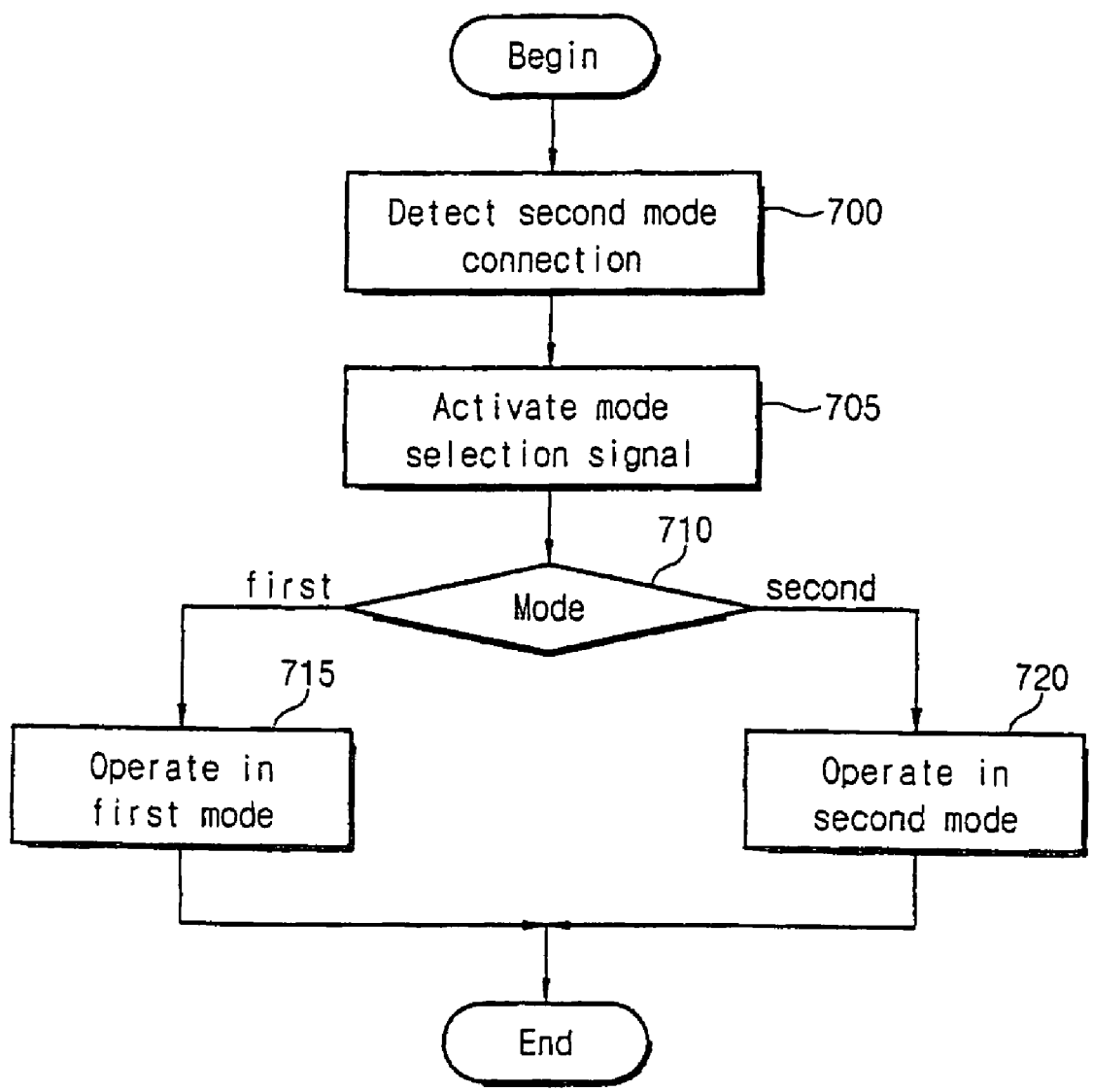

MULTI-MODE INTEGRATED CIRCUIT DEVICES INCLUDING MODE DETECTION AND METHODS OF OPERATING THE SAME

CROSS-REFERENCE TO RELATED APPLICATION

This application is a continuation of U.S. patent application Ser. No. 11/036,735, filed on Jan. 14, 2005, now U.S. Pat. No. 7,377,442, which claims priority from Korean Patent Application No. 2004-0052078, filed on Jul. 5, 2004, the disclosures of which are hereby incorporated herein by reference in their entirety.

BACKGROUND OF THE INVENTION

The present invention relates to integrated circuit devices and, more particularly, to multi-mode integrated circuit devices and methods of operating the same.

Smart cards (SC) are typically plastic cards having an embedded integrated circuit (IC). The integrated circuit may be, for example, a logic circuit with its associated memories or a microcontroller with its associated memories and software coupled to a custom integrated circuit block. The integrated circuit of a smart card is typically attached to a lead frame and wire-bonding techniques are used to connect paths of the integrated circuit to lead frame contacts. Potting and other strengthening methods may be used to protect the integrated circuit against chemical and mechanical stresses and the like. Contact pads are typically located on one side of the smart card and are provided in a limited, specified number, such as eight. The contact pads are typically utilized to perform transactions with a smart card reader using a serial protocol.

Various standards for smart cards are published by the International Standards Organization (ISO). The ISO 7816 standards have allowed extensive use of smart cards in a variety of applications, such as accounting, cryptography, personal authentication, and execution of JAVA scripts. ISO documents ISO 7816-1 Physical Characteristics, ISO 7816-2 Dimensions and Locations of contacts, ISO 7816-3 Electronic signals and transmission protocols and ISO 7816-10 Electronic signals and answer to reset for synchronous cards are included in the ISO 7816 standards for smart card operation.

Smart cards are used in a variety of different applications, such as cellular telephone, credit card and identification card applications utilizing authentication and/or security. For example, it is known to use authenticated smart cards in connection with prepaid cards in public telephony, for bankcards in Point of Sale (POS) terminals and Automatic Teller Machines (ATM), for pay TV providers in set top boxes and for wireless telecommunications operators, for example, in a subscriber identification module (SIM) used in the Global System for Mobile communications (GSM) terminals.

Smart cards typically perform communication transactions with the host through a smart card reader. For example, a personal computer system 100 is illustrated in FIG. 1 that is configured to read from a smart card. The personal computer system 100 includes a processor or host unit 110, a display 120 and a keyboard 130. Also shown in the system 100 in FIG. 1 is a mouse 140 and a smart card reader 150. The display 120, keyboard 130, mouse 140 and smart card reader 150 are coupled, either by cables and/or by wireless link, to the host unit 110. The smart card reader 150 communicates with a smart card 160 using a first protocol and with the host unit 110 using a second protocol. The first protocol is typically the ISO 7816 protocol discussed above complying with International Standard Organization (ISO) standards. The smart card reader 150 may be coupled to the host unit 110 by a serial port, parallel port, or the like using the second distinct protocol. The smart card 160 may be read, for example, in connection with secure transactions over the internet accessed using the personal computer system 100.

The card reader 150 typically contains electronic circuits and embedded software that enable communication with the smart card 160 using the ISO 7816 protocol and the host unit 110 using a serial protocol, such as an RS 232C protocol, through a serial port of the host unit 110. For a serial link, such as an RS 232C protocol serial link, between the smart card reader 150 and the host unit 110, a variety of communication rates may be supported, such as a base rate of 9600 bits per second (bps) or optional higher rates, such as two or four times the base rate. An overall data transmission speed between the smart card 160 and the host unit 110 may be limited because of the serial port low speed data rate for data transfer, which is typically below 1 Megabits per second (Mbps). As such, the reader 150 may need to read data from the smart card 160 and transmit the data to the host unit 110 of the personal computer system 100 after first buffering the data.

An alternative approach to reading smart card information is illustrated for the personal computer system 200 in FIG. 2. The personal computer system 200 includes a host unit 210 having the ability to support communications not only through a serial RS 232C type port but also through a Universal Serial Bus (USB) protocol port and/or an Institute of Electrical and Electronics Engineers (IEEE) 1394 protocol port. The smart card device 160' may communicate with the host using USB and/or IEEE 1394 protocols through a dongle 250. The dongle 250 is, essentially, little more than a connector socket with a plug 251 configured to connect to a USB or IEEE port of the host unit 110 using a cable or wireless connection. As such, a different dongle 250 configuration having a different connector 251 may be utilized depending upon whether USB or IEEE 1394 communications are to be used. The host unit 210 further is coupled to a display 220, keyboard 230 and mouse 240 to support user input/output communications.

Note that the smart card 160' of FIG. 2 is illustrated as including connectors (contact pads) 261 on an upper face thereof and the smart card 160 shown in FIG. 1 is illustrated with connectors 161 on an upper face thereof. The connectors 161, 261 may be utilized to enable input/output communications between the smart card 160, 160' and the respective smart card reader 150 or dongle 250.

It will be understood that the smart card 160 differs from the smart card 160' in that the smart card 160 is configured and specifically provided for reading in an ISO standard smart card reader 150 while the smart card 160' is configured to communicate with a USB protocol when the dongle 250 is configured for a USB interface 251 and a distinct different smart card is provided for reading by an IEEE 1394 dongle 250 with an IEEE 1394 connector 251. In other words, smart card 160 typically may not be read by the dongle 250 and the smart card 160' typically may be not read by the smart card reader 150.

By using a USB or IEEE 1394 interface, as with the personal computer system 200, a higher data transfer rate from the smart card 160' may be provided. For example, a USB interface typically supports a data communication rate of 12 Mbps or more and an IEEE 1394 interface typically supports a data communication rate of about 400 Mbps. As such, direct data transfer may be provided from the smart card 160' to the host unit 210 without utilizing buffering or the like in the dongle 250, therefore simplifying the dongle 250. In addition, hot plug and play capability may be provided without disrupting the personal computer system 200 when a smart card 160' is inserted into the dongle 250.

The USB interface can generally be described as a set of four wires of which two carry a power supply (VDD, VSS) and two other wires support data (D+, D−). The USB standard is defined by the Universal Serial Bus Specification written and controlled by USB Implementers Form Inc., a non-profit corporation founded by the group of companies that developed the USB specification.

SUMMARY OF THE INVENTION

Embodiments of the present invention provide multi-mode integrated circuit devices on an integrated circuit substrate that include a controller configured to operate in a first mode compliant with the International Standard Organization (ISO) specification ISO 7816 and a second mode different from ISO 7816 responsive to a mode selection signal. A first plurality of input/output pads is associated with operations in the first mode and a second plurality of input/output pads is associated with operations in the second mode. A mode detector circuit is coupled to at least one of the second plurality of input/output pads and configured to detect connection of the at least one of the second plurality of input/output pads to an external device and to activate the mode selection signal to select the second mode responsive to detection of connection of the at least one of the second plurality of input/output pads to the external device. The second mode may be an Institute for Electrical and Electronic Engineers (IEEE) 1394 protocol mode or a Universal Serial Bus (USB) protocol mode.

In further embodiments of the present invention, the controller is configured to generate a mode detection sample signal and the mode detector circuit is configured to activate the mode selection signal responsive to detection of connection of the at least one of the second plurality of input/output pads to an external device at a plurality of sequential times spaced at an interval defined by the mode detection sample signal. The mode detector circuit may be configured to detect an electrical characteristic, such as a resistance, of an external device connected to the at least one of the plurality of input/output pads. The mode detector circuit may be configured to activate the mode selection signal responsive to the electrical characteristic having a detected level between a first predetermined level and a second predetermined level.

In other embodiments of the present invention, the mode detector circuit has an active mode in which it is configured to detect connection of the at least one of the second plurality of input/output connectors to an external device and a power save mode. In the power save mode, the mode detector circuit may be disconnected from the at least one of the second plurality of input/output pads. The controller may be configured to disconnect the mode detector circuit from the at least one of the second plurality of input/output pads in the second mode.

In further embodiments of the present invention, the mode detector circuit includes a reference current generator circuit coupled to the at least one of the second plurality of input/output pads and a connection detect circuit coupled to the reference current generator circuit and to the at least one of the second plurality of input/output pads that activates the mode selection signal responsive to a detection output signal from the reference current generator circuit and to a signal on the at least one of the second plurality of input/output pads. A reference voltage generator circuit may also be included that outputs a reference voltage to the reference current generator circuit and to the connection detect circuit and the connection detect circuit may activate the mode selection signal responsive to the reference voltage, the output signal from the reference current generator circuit and the signal on the at least one of the second plurality of input/output pads. The controller may be configured to generate a switch signal in the second mode and the mode detector circuit may include a switch circuit that disconnects the mode detector circuit from the at least one of the second plurality of input/output pads responsive to the switch signal.

In yet other embodiments of the present invention, the reference current generator circuit includes first and second current source transistors, the current source transistors having current mirror characteristics, the second current source transistor having an output coupled to a first input of the connection detect circuit and to the at least one of the second plurality of input/output pads. A first resistor has a first node coupled to an output of the first current source transistor and to a second input of the connection detect circuit. A second resistor has a first node coupled in series to a second node of the first resistor. The connection detect circuit is configured to activate the mode selection signal responsive to a voltage at the first input of the detector circuit and a voltage at the second input to the connection detect circuit to select the second mode when the resistance of the external device coupled to the at least one of the second plurality of input/output pads is greater than a resistance of the second resistor and less than a sum of resistances the first and second resistor.

In further embodiments of the present invention, the controller is configured to generate a mode detection sample signal and the mode detector circuit is configured to activate the mode selection signal responsive to detection of connection of the at least one of the second plurality of input/output pads to an external device at a plurality of sequential times spaced at an interval defined by the mode detection sample signal. The mode detector circuit includes a shift register circuit clocked by the mode detection sample signal that activates the mode selection signal after detecting connection of the at least one of the second plurality of input/output pads to an external device at a plurality of sequential times spaced at an interval defined by the mode detection sample signal.

In yet further embodiments of the present invention, the reference current generator circuit includes an amplifier having a first input coupled to the reference voltage signal from the reference voltage signal generator, a second input coupled to the first node of the second resistor and an output coupled to gates of the first and second current source transistors. A system bus may be coupled to the controller and an ISO interface circuit and second mode interface circuit and a memory may be coupled to the system bus. The memory may be multiple memories including a random access memory (RAM) coupled to the system bus, a non-volatile memory (NVM) coupled to the system bus and a read only memory (ROM) coupled to the system bus.

A smart card system may be provided including a USB adapter module and a multi-mode device as described for various embodiments of the present invention above.

In yet other embodiments of the present invention, a multi-mode integrated circuit device on an integrated circuit substrate includes a controller configured to operate in a first mode compliant with the International Standard Organization (ISO) specification ISO 7816 protocol and a second mode different from ISO 7816 responsive to a mode selection signal. A first plurality of input/output pads is associated with operations in the first mode and a second plurality of input/output pads is associated with operations in the second mode.

A mode detector circuit coupled to at least one of the second plurality of input/output pads is configured to detect a resistance level of an external device connected to the at least one of the second plurality of input/output pads and to activate the mode selection signal to select the second mode responsive to detection of a resistance level of the external device between a first predetermined level and second predetermined level.

In further embodiments of the present invention, the controller is further configured to operate in a third mode compliant with an Institute for Electrical and Electronic Engineers (IEEE) 1394 protocol responsive to the mode selection signal and the mode detector circuit is configured to generate a first value of the mode selection signal responsive to detection of connection of the at least one of the second plurality of input/output pads to a USB external device and to generate a second value of the mode selection signal responsive to detection of connection of the at least one of the second plurality of input/output pads to an IEEE 1394 device.

In other embodiments of the present invention, a multi-mode integrated circuit device on an integrated circuit substrate includes a controller configured to operate in a first mode compliant with the International Standard Organization (ISO) specification ISO 7816 protocol and a second mode different from ISO 7816 responsive to a mode selection signal and to generate a mode detection sample signal. A first plurality of input/output pads is associated with operations in the first mode and a second plurality of input/output pads is associated with operations in the second mode. A mode detector circuit coupled to at least one of the first plurality or the second plurality of input/output pads is configured to detect connection of the at least one of the first plurality of input/output pads or the at least one of the second plurality of input/output connectors to an external device at a plurality of sequential times spaced at an interval defined by the mode detection sample signal and to drive the mode selection signal to select the first mode or the second mode responsive to detection of connection of the at least one of the first plurality of input/output pads or the at least one of the second plurality of input/output pads to the external device at the plurality of sequential times.

The mode detector circuit may be configured to detect connection of the at least one of the first plurality of input/output pads or the at least one of the second plurality of input/output connectors to an external device by detecting an electrical characteristic of an external device connected to the at least one of the first plurality of input/output pads or the at least one of the second plurality of input/output pads to an external device. The mode detector circuit may be configured to activate the mode selection signal responsive to the electrical characteristic having a detected level between a first predetermined level and a second predetermined level. The controller may be configured to disconnect the mode detector circuit from the second plurality of input/output pads in the second mode.

In further embodiments of the present invention, the mode detector circuit includes a reference current generator circuit coupled to the at least one of the second plurality of input/output pads and a connection detect circuit coupled to the reference current generator circuit that activates the mode selection signal responsive to a detection output signal from the reference current generator circuit. A reference voltage generator circuit may also be provided that outputs a reference voltage to the reference current generator circuit and to the connection detect circuit and the connection detect circuit may activate the mode selection signal responsive to the reference voltage and the output signal from the reference current generator circuit. The controller may be configured to generate a switch signal in the second mode and the mode detector circuit may include a switch circuit that disconnects the mode detector circuit from the second plurality of input/output connectors responsive to the switch signal.

In other embodiments of the present invention, the mode detector circuit further includes a shift register circuit clocked by the mode detection sample signal that activates the mode selection signal after detecting connection of the at least one of the second plurality of input/output pads to an external device at a plurality of sequential times spaced at an interval defined by the mode detection sample signal. The reference current generator circuit may further include an amplifier having a first input coupled to the reference voltage signal from the reference voltage signal generator, a second input coupled to the first node of the second resistor and an output coupled to gates of the first and second current source transistors.

In yet further embodiments of the present invention, methods for selection of an operating mode for a multi-mode integrated circuit smart card device configured to operate in a first mode compliant with the International Standard Organization (ISO) specification ISO 7816 and a second mode different from ISO 7816 include detecting connection of an input/output connector of the device associated with the second mode to an external device. A mode selection signal is activated responsive to detecting connection of the input/output connector of the device associated with the second mode to an external device. The device is operated in the second mode responsive to activation of the mode selection signal and may be operated in the first mode when the mode selection signal is not activated.

BRIEF DESCRIPTION OF THE DRAWINGS

The present invention will now be described with reference to the embodiments illustrated in the attached drawings in which:

FIG. 7 is a flowchart illustrating operations for selecting an operating mode of a multi-mode integrated circuit device according to some embodiments of the present invention.

DETAILED DESCRIPTION OF THE INVENTION

Figure 1:
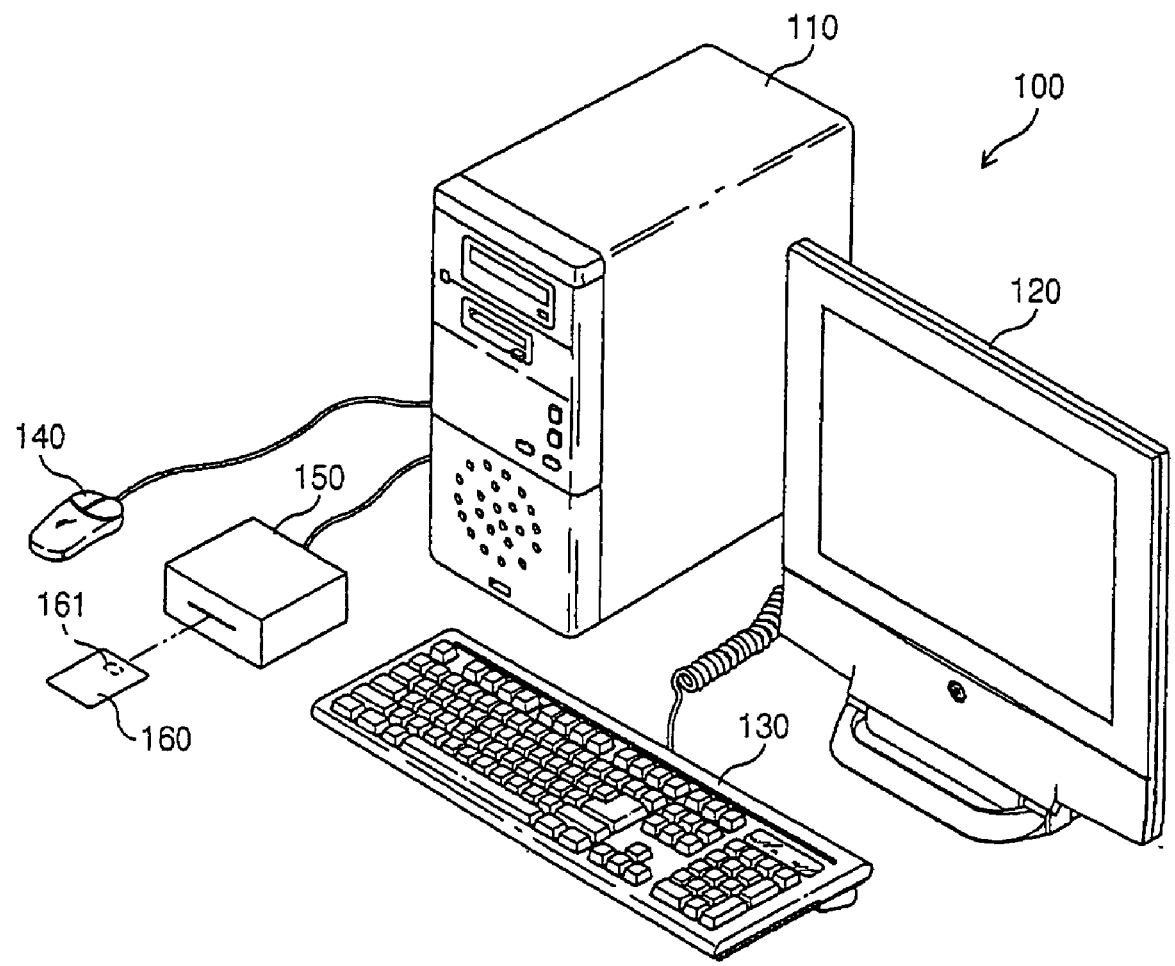
FIG. 1 is a schematic diagram illustrating a computer system including a smart card interface device according to the prior art.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. Signals may also be synchronized and/or undergo minor Boolean operations (e.g., inversion) without being considered different signals. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 3:
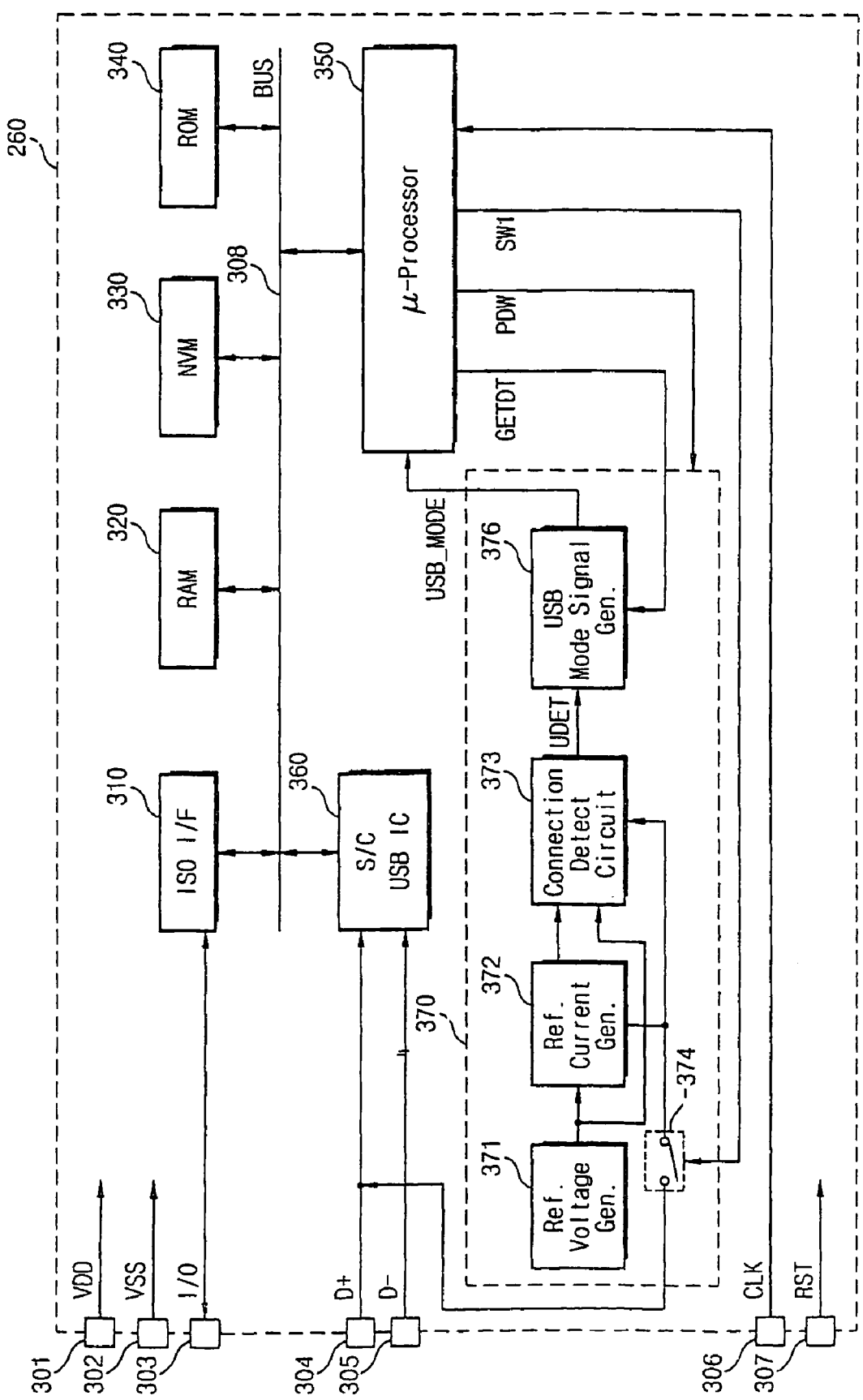
FIG. 3 is a block diagram illustrating a multi-mode integrated circuit device according to some embodiments of the present invention.

Various embodiments of the present invention will now be described with reference to FIGS. 3 through 7. FIG. 3 is a block diagram illustrating a multi-mode integrated circuit device on an integrated circuit (semiconductor) substrate according various embodiments of the present invention. The multi-mode integrated circuit (smart card) device 260 includes a microprocessor or controller 350 that is configured to operate in a first mode, compliant with the International Standard Organization (ISO) specification ISO-7816 and a second mode, different from ISO 7816 (illustrated as a USB mode) responsive to a mode selection signal USB_MODE. In particular, FIG. 3 illustrates a circuit diagram for a smart card including an ISO interface (IF) 310 and a USB interface circuit 360. The multi-mode integrated circuit (smart card) device 260 includes a plurality of contact pads including voltage inputs VDD 301 and VSS 302 and an ISO input/output (I/O) contact pad 303. The USB input/output pads include a contact pad 304 corresponding to the USB D+ signal and contact pad 305 corresponding to the USB D− signal. Also show in the embodiments of FIG. 3 are a clock (CLK) contact pad 306 and a reset (RST) contact pad 307.

While the multi-mode integrated circuit (smart card) device 260 supports both ISO 7816 and USB communications for the embodiments of the present invention illustrated in FIG. 3, it will be understood that further embodiments of the present invention include an IEEE 1394 interface circuit instead of and/or in addition to the USB interface circuit 360. For an IEEE 1394 interface, four additional contact pads will generally be provided corresponding to the signals TPA, ~TPA, TPB, ~TPB. In such embodiments, the multi-mode integrated circuit (smart card) device 260 may selectively operate in one of several non-ISO modes or in an ISO mode.

Also shown in the embodiments of FIG. 3 is a mode detector circuit 370 that is coupled to one of the input/output contact pads 304, 305 associated with the USB interface circuit 360. The mode detector circuit 370 is configured to detect connection of a contact pad 304, 305 to an external device and to active the mode selection signal USB_MODE to select the USB mode responsive to detection of connection of a contact pad 304, 305 to an external device. The detection of connection of the multi-mode integrated circuit (smart card) device 260 to a non-ISO port of an external host using one of the contact pads 304, 305 may occur, for example, during a power-up sequence of the multi-mode integrated circuit (smart card) device 260.

Figure 2:
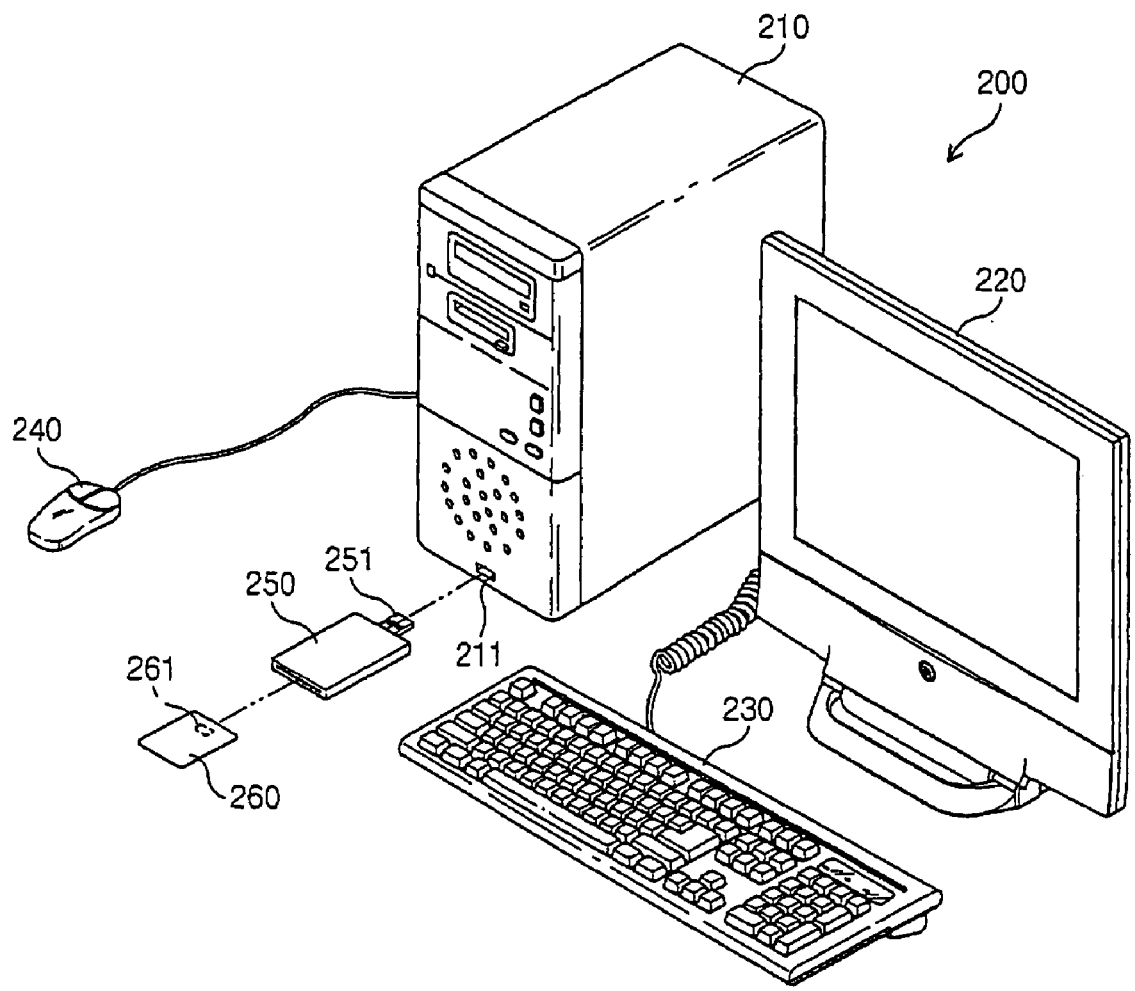
FIG. 2 is a schematic diagram illustrating a computer system including another smart card interface device according to the prior art.

As further illustrated in FIG. 3, the multi-mode integrated circuit (smart card) device 260 includes a system bus 308 coupled to the controller 350. In addition, the ISO interface circuit 310 and the USB interface circuit 360 are also connected to the system bus 308. For the embodiments illustrated in FIG. 3, a plurality of different memories are also coupled to the controller 350 over the system bus 308, including a random access memory (RAM) 320, a non-volatile memory (NVM) 330 and a read-only memory (ROM) 340. The USB interface contact pads 304, 305 may be coupled through a USB adaptor module to provide a smart card system including the multi-mode integrated circuit (smart card) device 260 of FIG. 3. Such a USB interface is illustrated, for example, in FIG. 2 as USB plug 251.

In the illustrated embodiments of FIG. 3, the mode detector circuit 370 includes a reference voltage generator circuit 371, a reference current generator circuit 372, a connection detect circuit 373, a switch circuit 374 and a USB mode signal generator circuit 376. The mode detector circuit 370 is configured to detect an electrical characteristic of an external device connected to the USB D+contact pad 304 in the illustrated embodiments of FIG. 3. However, it will be understood that, in other embodiments of the present invention, the mode detector circuit 370 may be configured and coupled to detect electrical characteristics on contact pad 305 or another of a plurality of contact pads associated with the non-ISO mode of the multi-mode integrated circuit (smart card) device 260. For the illustrated embodiments of FIG. 3, the mode detector circuit 370 is configured to activate the mode selection USB_MODE responsive to an electrical characteristic having a detected level between a first predetermined level and a second predetermined level as will be further discussed with reference to FIG. 4, which illustrates embodiments where the electrical characteristic is a resistance.

As shown in the embodiments of FIG. 3, the mode detector circuit 370 may be disconnected from the contact pad 304 by the switch circuit 374 responsive to a switch signal SW1 from the controller 350. As such, the mode detector circuit 370 may have an active mode, in which it is configured to detect connection of the contact pad 304 to an external device, and a power save mode where the mode detector circuit is disconnected from the contact pad 304. Thus the switch signal SW1 is provided to the switch circuit 374 to disconnect the mode detector circuit 370 from one or more input/output pads associated with the non-ISO mode of operation of the multi-mode integrated circuit (smart card) device 260.

For the embodiments of FIG. 3, the reference voltage generator circuit 371 outputs a reference voltage to the reference current generator circuit 372 and to the connection detect circuit 373. The connection detect circuit is also coupled through the switch circuit 374 to the contact pad 304 and to an output signal from the reference voltage generator circuit 371. The connection detect circuit 373 activates the detection output signal UDET responsive to the reference voltage from the reference voltage generator circuit 371, a signal level from the contact pad 304 connection and the output signal from the reference current generator circuit 372. The reference current generator circuit 372 is also coupled to the input/output contact pad 304 used for the USB mode of the multi-mode integrated circuit (smart card) device 260.

As will be further described with reference to FIG. 4, the reference current generator circuit 372 generates a reference current responsive to the input reference voltage signal from the reference voltage generator 371 and supplies the input/output contact pad 304 with the current when the switch 374 is closed responsive to the switching signal SW1. For the configuration shown in FIG. 3, the connection detect circuit 373 sets UDET to an active state (logic high) when the reference current is discharged through the contact pad 304 at a predefined level indicating that the D+contact pad 304 is connected to a non-ISO pad of a host device. In other words, when a USB communication interface is available for communication from the multi-mode integrated circuit (smart card) device 260 to a USB host, the USB mode may be selected.

The mode signal generator circuit 376 for the illustrated embodiments of FIG. 3 sets USB_MODE to an active state (logic high) when UDET is set to an active state a predetermined number of times as will be further described with reference to FIG. 4. More particulary, the mode signal generator circuit 376 activates the USB_MODE signal responsive to UDET based on the mode detection sample signal GETDT from the controller 350.

For the embodiments illustrated in FIG. 3, if the USB_MODE signal is inactive, the multi-mode integrated circuit (smart card) device 260 operates in the ISO mode. In the ISO mode, the D+ and D− pads 304, 305 may be disabled. When the USB_MODE signal is active, the multi-mode integrated circuit (smart card) device 260 operates in a non-ISO (USB shown in FIG. 3) mode. In the non-ISO mode, the contact pads associated with ISO operation, including the I/O contact pad 303, the CLK contact pad 306 and the RST contact pad 307 may be disabled.

Figure 4:
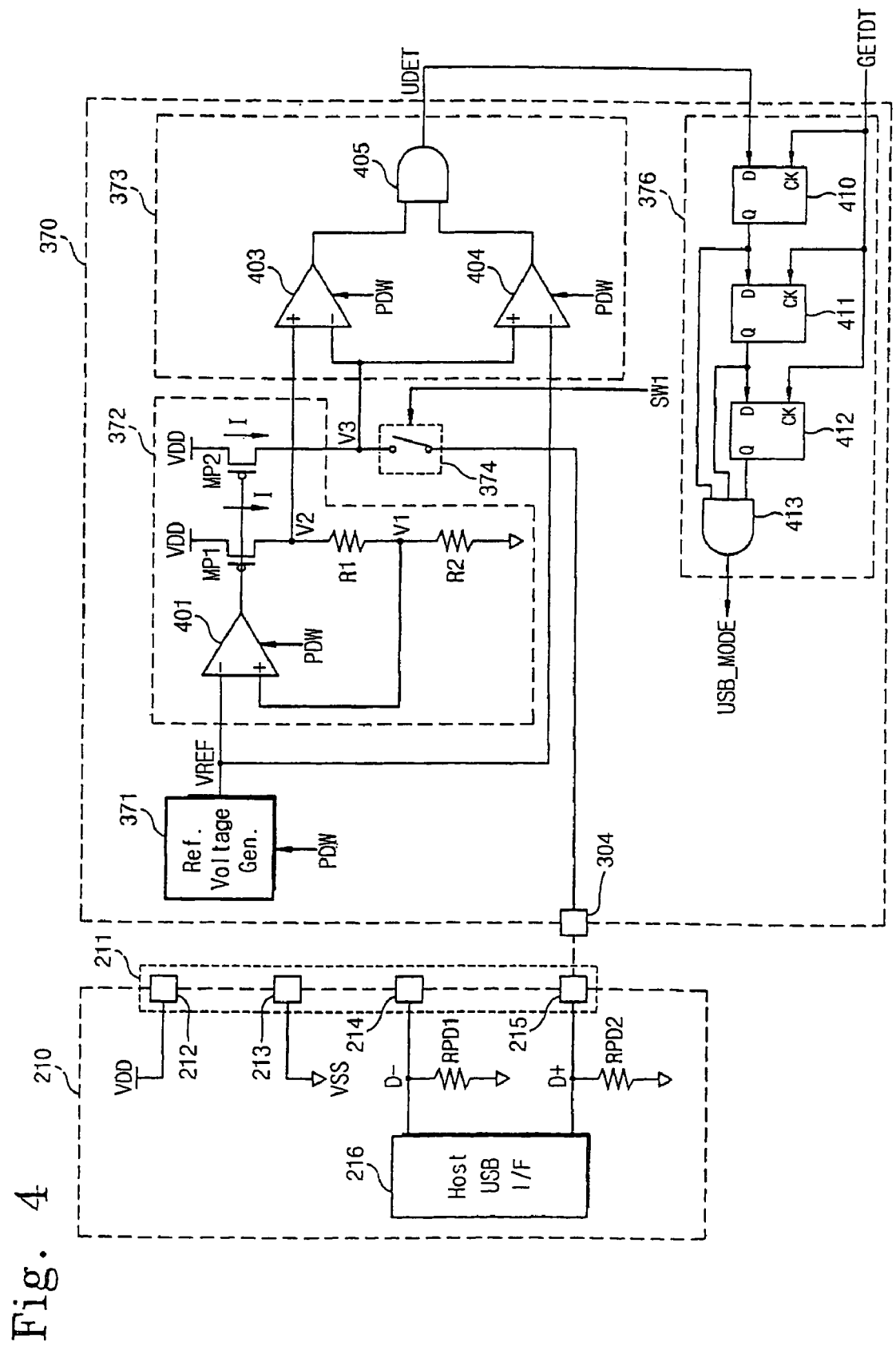
FIG. 4 is a block diagram illustrating a mode detector circuit according to some embodiments of the present invention.

Referring now to FIG. 4, a mode detector circuit 370 according to various embodiments of the present invention will now be further described. As shown in the embodiments of FIG. 4, the mode detector circuit 370 is coupled to a USB host device 210. The USB contact pads 211 of the host device 210 shown in FIG. 4 include a voltage source VDD contact pad 212, voltage ground reference VSS contact pad 213, a D− contact pad 214 and a D+contact pad 215. The D− contact pad 214 and the D+contact pad 215 are coupled to a host USB interface circuit 216. In addition, the D− contact pad 214 is coupled through a pull-down resistor RPD1 to a ground reference and the D+contact pad 215 is coupled through a pull-down resistor RPD2 to the ground reference. The contact pad 215 is coupled to the contact pad 304 of the mode detector circuit 370.

The reference voltage generator 371 of the mode detector circuit 370 is connected to the PDW signal from the controller 350 and outputs a voltage reference signal VREF to the reference current generator circuit 372 and to the connection detect circuit 373. The reference current generator circuit 372 includes an operational amplifier 401, two MOSFET transistors MP1, MP2 and two resistors R1, R2. The MOSFET transistors MP1, MP2 for the illustrated embodiments of FIG. 4 are selected to have the same voltage from gate to source ($V_{gs}$) and are connected to act as a current mirror circuit. In other words, the current I through the transistor MP1 and the current I through the transistor MP2 are substantially the same when current is flowing through transistor MP2 (note that when the switch circuit 374 is open or no external device is connected to contact pad 304 substantially no current would be expected to flow through transistor MP2).

An output voltage from the operational amplifier 401 is coupled to the gates of the transistors MP1 and MP2. A voltage level V1 between the resistors R1 and R2 is fed back as an input to the operational amplifier 401. Accordingly, the voltage level V1 rises to the voltage reference VREF level through the operational amplifier 401 and the transistor MP1. As the current through the transistor MP1 is equal to V1 (=VREF)/R2, the voltage level V2 equals VREF (1+R1/R2)). In other words, resistors R1 and R2 operate as a voltage divider circuit with the voltage between R1 and R2 (V1) being set to VREF.

As discussed with reference to the embodiments of FIG. 3, a switch circuit 374 may be turned on in response to a switching signal SW1 from the controller 350 to activate a mode detection active mode of the mode detector circuit 370. In the active mode, with the switch 374 closed, the detection output signal voltage V3 from the reference current generator 372 will be at the source voltage reference level VDD input to the transistors MP1, MP2 when the D+ contact pad 304 is not connected to a D+ contact pad 215 of a host and is, instead, an open circuit. However, if the D+ contact pad 304 is connected to the D+ contact pad 215 of a host 210, the detection output signal voltage V3 is lowered due to discharge of current through the pull down resistor RPD2 in the host 210.

The connection detect circuit 373 includes operational amplifiers 403, 404 and an AND gate 405. An input of each of the operational amplifiers 403, 404 is coupled to the detection output signal having a voltage V3 from the reference current generator circuit 372. A second input of the operational amplifier 403 is coupled to the resistor R1 at the V2 voltage level. A second input of the operational amplifier 404 is coupled to the D+ contact pad 304. The outputs of the operational amplifiers 403 and 404 are coupled to the AND gate 405, which outputs the mode detect signal UDET.

The connection detect circuit 373 sets UDET to an active state (level) when the detection output signal voltage V3 is higher than the reference voltage VREF and is also lower than the voltage level V2. In some embodiments of the present invention, the voltage level V2 may be set to be about twice the reference voltage VREF. In particular embodiments of the present invention, the reference voltage VREF is 1.2 volts, the source voltage VDD is 3.3 volts, the resistor R1 is 10 kiloohms (kΩ), the resistor R2 is also 10 kΩ and the pull-down resistors RPD1 and RPD2 are 15 kΩ. As a result, when connected to a host device 210, a 15 kΩ resistor is positioned between the voltage reference V3 and the ground reference, a 10 kΩ resistance R2 is positioned between the voltage reference V1 and a ground reference and a 20 kΩ resistance (R1+R2) is positioned between the voltage reference V2 and the ground reference. As such, with the current substantially the same through both of the transistors MP1 and MP2, the detector output signal voltage V3 will fall substantially at a midpoint between the voltage references V2 and V1.

The connection detect circuit 373 detects the voltage level V2 being greater than V3 using the operational amplifier 403 and detects the detection output signal voltage level V3 being greater than the reference voltage level VREF, which equals the voltage reference level V1, using the operational amplifier 404. When both conditions are true, the AND gate 405 sets UDET to an active (logic high) state.

The output UDET from the connection detect circuit 373 is fed to the mode signal generator circuit 376. The mode signal generator circuit 376 is configured to activate the mode selection signal USB_MODE responsive to detection of connection of the contact pad 304 to an external host device 210, a plurality of sequential times spaced at an interval defined by the mode detection sample signal GETDT.

The mode detection sample signal GETDT is generated by the controller 350 as illustrated in FIG. 3. In particular embodiments of the mode signal generator circuit 376 shown in FIG. 4, the USB_MODE signal is set to an active state when the mode signal generator circuit 376 receives the signal UDET in the activated state three times in a row within a determined time period set by the clocking rate of the sample signal GETDT. The three sequential detections of UDET in an active state are provided by the use of three flip-flops 410, 411, 412, each of which is clocked by the sample signal GETDT. The signal UDET is fed into a first of the flip-flops 410 with an output thereof coupled to the input of the next flip-flop 411 as well as to an AND gate 413. The output of the second flip-flop 411 is fed to an input of the third flip-flop 412 as well as to an input of the AND gate 413. Finally the output of the third flip-flop 412 is also fed to the AND gate 413. As a result, the output signal USB_MODE is set to a high active state when UDET is clocked three sequential times at an active state through the flip-flop circuits 410, 411, 412. In some embodiments of the present invention, use of mode signal generator circuit 375 may reduce the risk of or prevent erroneous detection of UDET caused by human interface interactions, such as when a smart card connector is inserted into a host connector or removed therefrom.

After determining the interface mode of the multi-mode integrated circuit (smart card) device 260 and setting the signal USB_MODE, current feed to the mode detector circuit 370 may be cut off. In addition, the switch circuit 374 may be opened. For example, current to the mode detector circuit 370 may be cut off responsive to the PDW signal described above to reduce power consumption by the mode detector circuit 370 in addition to opening of the switch circuit 374.

To summarize, as illustrated by the embodiments of the present invention shown in FIG. 4, a reference current generator circuit 372 may include a first MP1 and second MP2 current source transistors having current mirror characteristics. The second current source transistor MP2 has an output coupled to a first input of the connection detect circuit 373 and to the contact pad 304 through the switch circuit 374. A first resistor R1 has a first node coupled to an output of the first current source transistor MP1 and to second input of the connection detect circuit 373. A second resistor R2 has a first node coupled in series to an additional node of the first resistor R1. With this arrangement, the connection detect circuit 373 is configured to activate the mode selection signal USB_MODE responsive to a detection output signal voltage V3 at a first input of the connection detect circuit 373 and a voltage V2 at a second input to the connection detect circuit 373 to detect the non-ISO operating mode when the resistance of the external device 210 coupled to the contact pad 304 is greater than the second resistor R2 and less than a sum of the first R1 and second R2 resistor. The shift register circuit of the mode signal generator circuit 376, including the plurality of flip-flops 410, 411, 412 and the AND gate 413, clocked by the mode detection signal GETDT, activates the mode selection signal USB_MODE after detecting connection of the contact pad 304 to the external host device 210 at a plurality of sequential times set by the sample signal GETDT. The mode detection signal USB_MODE may thereby be activated responsive to detection of a resistance level of the external host device 210 between a first predetermined level and a second predetermined level established by selection of the resistor values R1, R2 relative to the resistance characteristic of the pull down resistor RPD2 of the host device 210.

While described above to simplify understanding of various embodiments of the present invention with reference to a two mode multi-mode integrated circuit device where the second mode (or non-ISO mode) is a USB mode, it will be understood, as discussed previously, that the multi-mode device may be an ISO and IEEE multi-mode device. In addition, a third mode may be added to the embodiments as described above so as to operate in a third mode compliant with an Institute for Electrical and Electronic Engineers (IEEE)1394 protocol responsive to a mode detection signal. In such instances, the mode detector circuit 370 may be configured to generate a first value (USB_MODE) of the mode detection signal responsive to detection of connection of a contact pad to a USB external device and to generate a second value (IEEE_MODE) of the mode detection signal responsive to detection of connection of a non-ISO contact pad to an IEEE 1394 host device. It will be further understood that, in such embodiments, the circuitry described above for detection of a resistance value characteristic of an external device may be duplicated for detection of connection of an external IEEE 1394 device with the resistance values of the resistors R1, R2 selected to provide detection of the corresponding load resistance of an IEEE 1394 host device 210. It will be further understood that the electrical characteristic detected at the connection need not be a resistance and may be, for example, a capacitance, inductance, impendance or the like, and that different driving signals coupled through a switch circuit 374 for testing such other electrical characteristics may be incorporated in further embodiments of the present invention.

Figure 5:
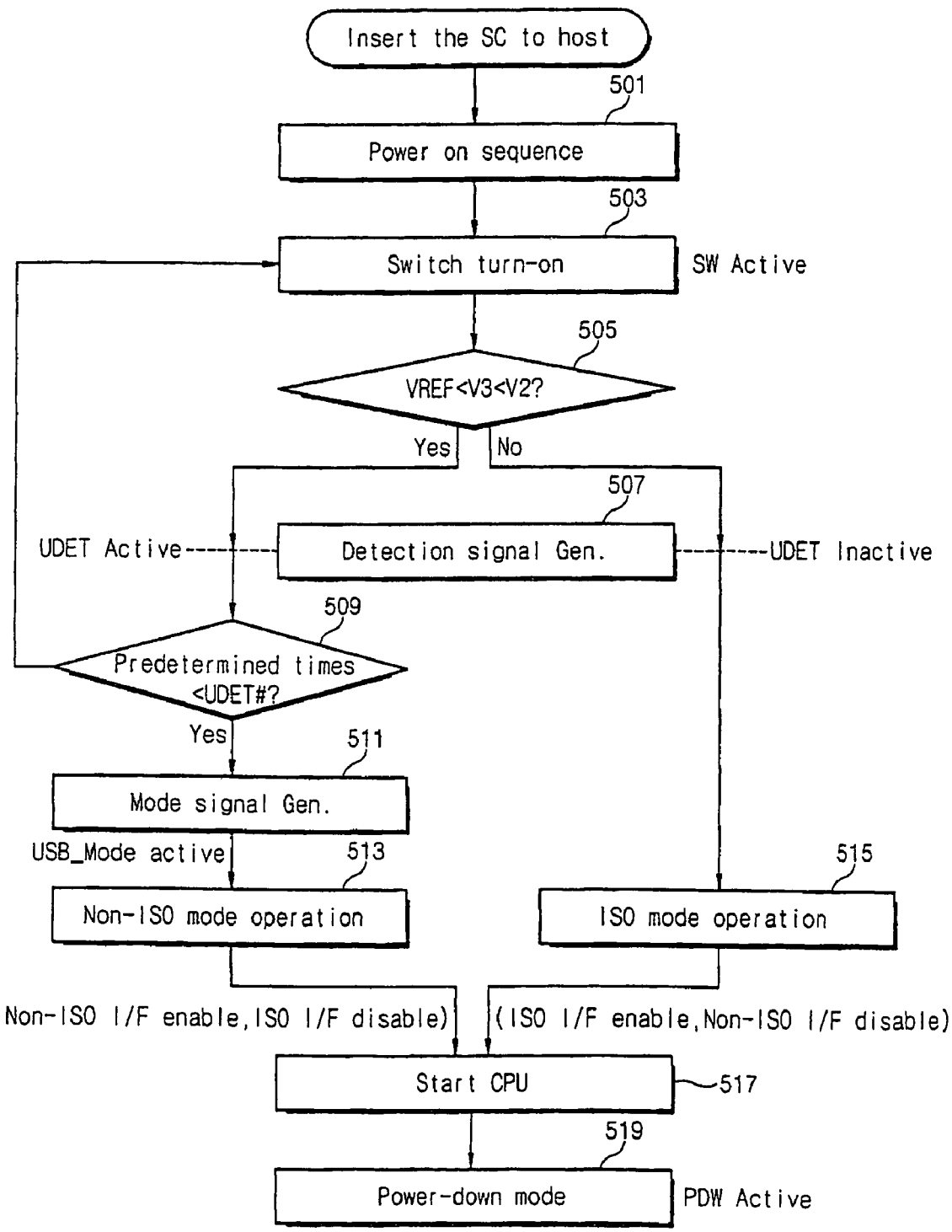
FIG. 5 is a flowchart illustrating operations for selecting an operating mode of a multi-mode integrated circuit device according to some embodiments of the present invention.

Operations for mode selection of a multi-mode integrated circuit smart card device according to various embodiments of the present invention will now be described with reference to the flowchart diagram of FIG. 5. As shown in the embodiments of FIG. 5, after insertion of the smart card integrated circuit device into a host device reader, a power-on sequence for the smart card integrated circuit device commences (Block 501). Active mode for the mode detection circuit is then initiated by turning on the switch circuit 374 (Block 503) following a power-on sequence at Block 501 that may include activating the signal PDW to power up additional circuitry within the mode detector circuit 370. After turning on the switch circuit 374, if the voltage V3 is greater than the reference voltage VREF and less than the voltage V2 (Block 505), the detection signal UDET is generated at an active state (Block 507). If UDET is detected as active a predetermined number of times (Block 509), the mode detect signal is generated (Block 511). When the USB_MODE signal is active, non-ISO operations are initiated (Block 513). Operations at Block 513 may include enabling the non-ISO interface contact pads and disabling the ISO interface contact pads.

When the voltage V3 is less than the reference voltage VREF or when the voltage V3 is greater than the voltage V2 (Block 505), the detection signal is generated as UDET inactive (Block 507). ISO-mode operations are then initiated (Block 515). Operations at Block 515 may include enabling the ISO interface contact pads and disabling the non-ISO interface contact pads and circuitry. The CPU/controller operations are initiated (Block 517). As shown in FIG. 5, for some embodiments of the present invention, a power-down mode for the mode detection circuit may then be generated, for example, by activating the signal PDW for the embodiments illustrated in FIGS. 3 and 4 (Block 519).

Figure 6:
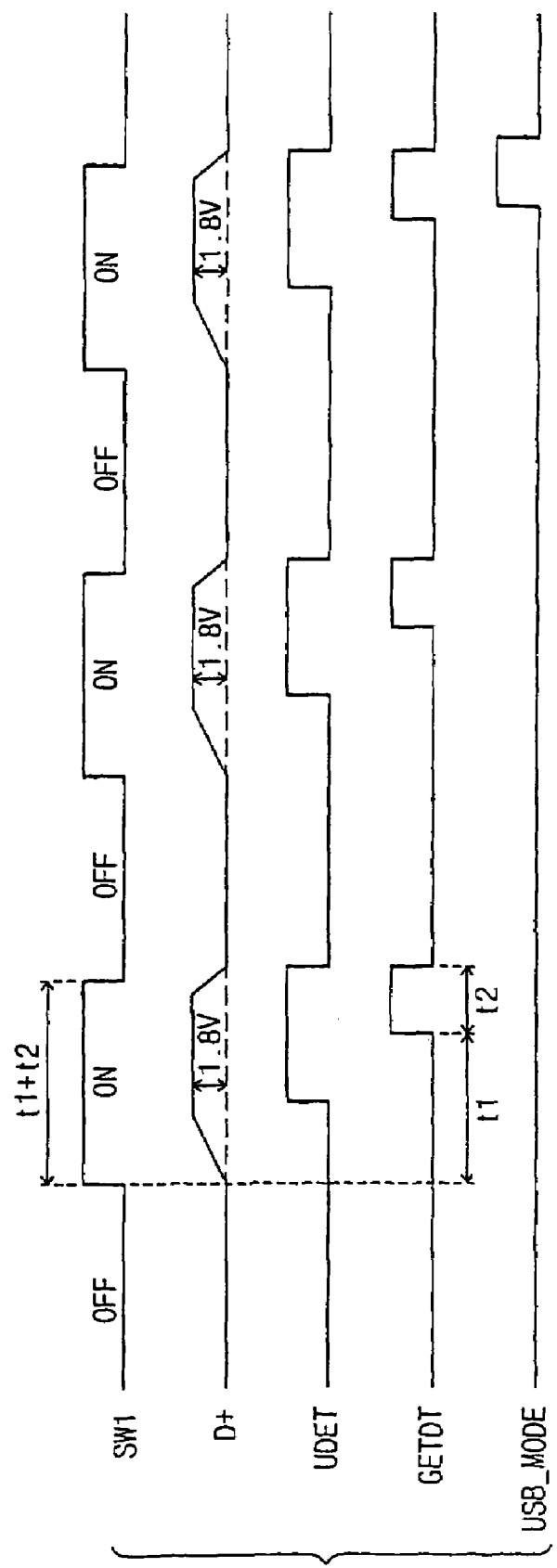
FIG. 6 is a timing diagram illustrating operations of a multi-mode integrated circuit device according to some embodiments of the present invention.

Timing operations relating to some embodiments of the present invention are illustrated in FIG. 6, where the signals SW1, D+, UDET, GETDT and USB_MODE correspond to the signal notation shown in the embodiments of FIG. 3. Note that, for the illustrated embodiments of FIG. 6, connection of an external circuit to the contact pad for the D+ signal must be detected three sequential times before the USB_MODE signal is generated, with the GETDT signal clocking detection of connection of the external device at three sequential times to set the USB_MODE signal. As also shown in FIG. 6, in some embodiments of the present invention, the switch signal SW1 is not maintained on throughout the sequence of multiple samples of GETDT, but is instead only activated during respective sample windows. Such intermittent timed operations may reduce the power consumption of the mode detector circuit 370.

Methods for selection of an operating mode for a multi-mode integrated circuit smart card device configured to operate in a first mode compliant with the International Standard Organization (ISO) specification ISO 7816 and in a second mode, different from ISO 7816, according to some embodiments of the present invention will now be described with reference to FIG. 7. As shown in FIG. 7, connection of an input/output connector of the device associated with the second mode to an external device is detected (Block 700). A mode selection signal is activated responsive to detecting connection of the input/output connector of the device associated with the second mode to an external device (Block 705). If a connection to an external device on an input/output connector associated with the second mode is detected (Block 710), operation in the second mode is initiated (Block 720). If an external device is not connected to an input/output connector associated with the second mode (Block 710), operations in the first (or ISO 7816 compliant) mode is selected (Block 715).

It will be noted that, in some alternate implementations, the functions/acts noted in the blocks of FIGS. 5 and 7 may occur out of the order noted in the flowchart. For example, two blocks shown in succession may, in fact, be executed substantially concurrently, or the blocks may sometimes be executed in the reverse order, depending upon the functionality/acts involved.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A multi-mode integrated circuit device, comprising:
  a controller configured to operate in a first mode compliant with the International Standard Organization (ISO) specification ISO 7816 and a second mode different from ISO 7816 responsive to a mode selection signal;
  a first plurality of input/output pads associated with operations in the first mode;
  a second plurality of input/output pads associated with operations in the second mode, the second plurality of input/output pads including a first voltage input/output pad, a second voltage input/output pad and a data input/output pad configured for a cable connection to communicate with an external device; and
  a mode detector circuit coupled to at least one of the second plurality of input/output pads and configured to detect connection of the at least one of the second plurality of input/output pads to the external device and to activate the mode selection signal to select the second mode responsive to detection of connection of the at least one of the second plurality of input/output pads to the external device.

2. The multi-mode integrated circuit device of claim 1 wherein the second mode comprises an Institute for Electrical and Electronic Engineers (IEEE) 1394 protocol mode or a Universal Serial Bus (USB) protocol mode.

3. The multi-mode device of claim 1 wherein the controller is configured to generate a mode detection sample signal and wherein the mode detector circuit is configured to activate the mode selection signal responsive to detection of connection of the at least one of the second plurality of input/output pads to an external device at a plurality of sequential times spaced at an interval defined by the mode detection sample signal.

4. The multi-mode device of claim 1 wherein the mode detector circuit is configured to detect an electrical characteristic of an external device connected to the at least one of the plurality of input/output pads.

5. The multi-mode device of claim 4 wherein the mode detector circuit is configured to activate the mode selection signal responsive to the electrical characteristic having a detected level between a first predetermined level and a second predetermined level.

6. The multi-mode device of claim 5 wherein the electrical characteristic comprises a resistance.

7. The multi-mode device of claim 6 wherein the mode detector circuit has an active mode in which the mode detector circuit is configured to detect connection of the at least one of the second plurality of input/output connectors to an external device and a power save mode.

8. The multi-mode device of claim 7 wherein, in the power save mode, the mode detector circuit is disconnected from the at least one of the second plurality of input/output pads.

9. The multi-mode device of claim 6 wherein the controller is configured to disconnect the mode detector circuit from the at least one of the second plurality of input/output pads in the second mode.

10. A smart card system comprising a USB adapter module and the multi-mode device of claim 1.

11. A multi-mode integrated circuit device, comprising:
a controller configured to operate in a first mode compliant with the International Standard Organization (ISO) specification ISO 7816 and a second mode different from ISO 7816 responsive to a mode selection signal;
a first plurality of input/output pads associated with operations in the first mode;
a second plurality of input/output pads associated with operations in the second mode; and
a mode detector circuit coupled to at least one of the second plurality of input/output pads and configured to detect connection of the at least one of the second plurality of input/output pads to an external device and to activate the mode selection signal to select the second mode responsive to detection of connection of the at least one of the second plurality of input/output pads to the external device, wherein the mode detector circuit comprises:
a reference current generator circuit coupled to the at least one of the second plurality of input/output pads; and
a connection detect circuit coupled to the reference current generator circuit and to the at least one of the second plurality of input/output pads that activates the mode selection signal responsive to a detection output signal from the reference current generator circuit and to a signal on the at least one of the second plurality of input/output pads.

12. The multi-mode device of claim 10 further comprising a reference voltage generator circuit that outputs a reference voltage to the reference current generator circuit and to the connection detect circuit and wherein the connection detect circuit activates the mode selection signal responsive to the reference voltage, the output signal from the reference current generator circuit and the signal on the at least one of the second plurality of input/output pads.

13. The multi-mode device of claim 12 wherein the controller is configured to generate a switch signal in the second mode and wherein the mode detector circuit includes a switch circuit that disconnects the mode detector circuit from the at least one of the second plurality of input/output pads responsive to the switch signal.

14. The multi-mode device of claim 12 wherein the reference current generator circuit comprises:
first and second current source transistors, the current source transistors having current mirror characteristics, the second current source transistor having an output coupled to a first input of the connection detect circuit and to the at least one of the second plurality of input/output pads;
a first resistor having a first node coupled to an output of the first current source transistor and to a second input of the connection detect circuit;
a second resistor having a first node coupled in series to a second node of the first resistor; and
wherein the connection detect circuit is configured to activate the mode selection signal responsive to a voltage at the first input of the connection detect circuit and a voltage at the second input to the connection detect circuit to select the second mode when the resistance of the external device coupled to the at least one of the second plurality of input/output pads is greater than a resistance of the second resistor and less than a sum of resistances of the first and second resistor.

15. The multi-mode device of claim 14, wherein the controller is configured to generate a mode detection sample signal and wherein the mode detector circuit is configured to activate the mode selection signal responsive to detection of connection of the at least one of the second plurality of input/output pads to an external device at a plurality of sequential times spaced at an interval defined by the mode detection sample signal.

16. The multi-mode device of claim 15 wherein the mode detector circuit further comprises a shift register circuit clocked by the mode detection sample signal that activates the mode selection signal after detecting connection of the at least one of the second plurality of input/output pads to an external device at a plurality of sequential times spaced at an interval defined by the mode detection sample signal.

17. The multi-mode device of claim 14 wherein the second mode comprises a Universal Serial Bus (USB) protocol mode.

18. The multi-mode device of claim 14 wherein the reference current generator circuit further comprises an amplifier having a first input coupled to the reference voltage signal from the reference voltage signal generator, a second input coupled to the first node of the second resistor and an output coupled to gates of the first and second current source transistors.

19. The multi-mode device of claim 18 further comprising:
a system bus coupled to the controller;
an ISO interface circuit coupled to the system bus;
a second mode interface circuit coupled to the system bus; and
a memory coupled to the system bus.

20. The multi-mode device of claim 19 wherein the memory comprises:
a random access memory (RAM) coupled to the system bus;
a non-volatile memory (NVM) coupled to the system bus; and
a read only memory (ROM) coupled to the system bus.

21. A multi-mode integrated circuit device, comprising:
a controller configured to operate in a first mode compliant with the International Standard Organization (ISO) specification ISO 7816 protocol and a second mode different from ISO 7816 responsive to a mode selection signal;
a first plurality of input/output pads associated with operations in the first mode;
a second plurality of input/output pads associated with operations in the second mode, the second plurality of input/output pads including a first voltage input/output pad, a second voltage input/output pad and a data input/output pad configured for a cable connection to communicate with an external device; and
a mode detector circuit coupled to at least one of the second plurality of input/output pads and configured to detect a resistance level of the external device when it is connected to the at least one of the second plurality of input/output pads and to activate the mode selection signal to select the second mode responsive to detection of a resistance level of the external device between a first predetermined level and second predetermined level.

22. The multi-mode integrated circuit device of claim 21 wherein the second mode comprises a Universal Serial Bus (USB) mode.

23. The multi-mode integrated circuit device of claim 22 wherein:
the controller is further configured to operate in a third mode compliant with an Institute for Electrical and Electronic Engineers (IEEE) 1394 protocol responsive to the mode selection signal; and
wherein the mode detector circuit is configured to generate a first value of the mode selection signal responsive to detection of connection of the at least one of the second plurality of input/output pads to a USB external device and to generate a second value of the mode selection signal responsive to detection of connection of the at least one of the second plurality of input/output pads to an IEEE 1394 device.

24. A multi-mode integrated circuit device, comprising:
a controller configured to operate in a first mode compliant with the International Standard Organization (ISO) specification ISO 7816 protocol and a second mode different from ISO 7816 responsive to a mode selection signal and to generate a mode detection sample signal;
a first plurality of input/output pads associated with operations in the first mode;
a second plurality of input/output pads associated with operations in the second mode; and
a mode detector circuit coupled to at least one of the first plurality or the second plurality of input/output pads and configured to detect connection of the at least one of the first plurality of input/output pads or the at least one of the second plurality of input/output connectors to an external device at a plurality of sequential times spaced at an interval defined by the mode detection sample signal and to drive the mode selection signal to select the first mode or the second mode responsive to detection of connection of the at least one of the first plurality of input/output pads or the at least one of the second plurality of input/output pads to the external device at the plurality of sequential times.

25. The multi-mode integrated circuit device of claim 24 wherein the second mode comprises an Institute for Electrical and Electronic Engineers (IEEE) 1394 protocol mode or a Universal Serial Bus (USB) protocol mode.

26. The multi-mode device of claim 25 wherein the mode detector circuit is configured to detect connection of the at least one of the first plurality of input/output pads or the at least one of the second plurality of input/output connectors to an external device by detecting an electrical characteristic of an external device connected to the at least one of the first plurality of input/output pads or the at least one of the second plurality of input/output pads to an external device.

27. The multi-mode device of claim 26 wherein the mode detector circuit is configured to activate the mode selection signal responsive to the electrical characteristic having a detected level between a first predetermined level and a second predetermined level.

28. The multi-mode device of claim 27 wherein the electrical characteristic comprises a resistance.

29. The multi-mode device of claim 28 wherein the controller is configured to disconnect the mode detector circuit from the second plurality of input/output pads in the second mode.

* * * * *